US008315807B2

(12) United States Patent
Hiyama et al.

(10) Patent No.: US 8,315,807 B2
(45) Date of Patent: Nov. 20, 2012

(54) MOLECULAR COMMUNICATION SYSTEM

(75) Inventors: Satoshi Hiyama, Yokohama (JP); Yuki Moritani, Yokohama (JP); Tatsuya Suda, Fallbrook, CA (US)

(73) Assignee: NTT DoCoMo, Inc., Tokyo (JP)

( * ) Notice: Subject to any disclaimer, the term of this patent is extended or adjusted under 35 U.S.C. 154(b) by 1365 days.

(21) Appl. No.: 11/663,304

(22) PCT Filed: Mar. 3, 2006

(86) PCT No.: PCT/JP2006/304101
§ 371 (c)(1),
(2), (4) Date: Mar. 21, 2007

(87) PCT Pub. No.: WO2006/095651
PCT Pub. Date: Sep. 14, 2006

(65) Prior Publication Data
US 2008/0280342 A1 Nov. 13, 2008

(30) Foreign Application Priority Data

Mar. 7, 2005 (JP) .................................. 2005-063105

(51) Int. Cl.
*G06F 19/00* (2011.01)
*C12P 19/34* (2006.01)
*C12Q 1/58* (2006.01)
(52) U.S. Cl. ........... 702/19; 435/6.1; 435/91.1; 977/702
(58) Field of Classification Search .................. None
See application file for complete search history.

(56) References Cited

U.S. PATENT DOCUMENTS

2004/0093575 A1    5/2004   Heath et al.

FOREIGN PATENT DOCUMENTS

| JP | 6 74143 | 3/1994 |
|----|---------|--------|
| JP | 2002 18799 | 1/2002 |
| JP | 2003 101485 | 4/2003 |
| WO | 2004 036011 | 4/2004 |

OTHER PUBLICATIONS

Hess et al. (Nano Letters (2003) vol. 3, No. 12, pp. 1651-1655).*
Hess et al. (Reviews in Molecular Biotechnology (2001) vol. 82, pp. 67-85).*
Hess et al. (Nano Letters (2001) vol. 1, No. 5, pp. 235-239).*
Tadashi Nakano, et al., "Molecular Communication for Nanomachines Using Intercellular Calcium Signaling", 5th IEEE Conference on Nanotechnology, Institute of Electrical and Electronics Engineers, vol. 2, pp. 478-481, 2005.
S. Hiyama, et al., "Molecular Communication", Proceedings of the 2005 NSTI Nanotechnology Conference, Nano Science and Technology Institute, vol. 3, pp. 392-395, 2005.
Ryuji Yokokawa, et al., "Control of Biomolecular Motors for Nano Transfer System", The Japan Society of Mechanical Engineers, 2P1-3F-G8 (1)-2P1-3F-G8 (2), 2003.
Ryuji Yokokawa, et al., "Hybrid Nanotransport System by Biomolecular Linear Motors", Journal of Microelectromechanical Systems, vol. 13, No. 4, pp. 612-619, 2004.
Yuichi Hiratsuka, et al., "Controlling the Direction of Kinesin-Driven Microtubule Movements Along Microlithographic Tracks", Biophysical Journal, vol. 81, No. 3, pp. 1555-1561, 2001.
Jin-Ho, et al., "Inorganic-Biomolecular Hybrid Nanomaterials As a Genetic Molecular Code System", Advanced Materials, vol. 16, No. 14, pp. 1181-1184, 2004.
Tom A. Van De Goor, "Nanopore Detection: Threading DNA Through a Tiny Hole", Pharmagenomics, pp. 28 & 30, 2004.
Yasutaka Tanaka, et al., "Study for Synthesis and Physical Property of New Optically-Active Aromatic Molecule Seeking Molecular Memory", Shizuoka University Venture Business Laboratory Research and Development Project Report, 2000.
Yoshihiro Yoneda, "Getting Into Intracellular Transport", ISBN: 4897069963, Yodosha Co., Ltd. pp. 45-53, 2002.
U.S. Appl. No. 11/740,466, filed Apr. 26, 2007, Moritani, et al.

* cited by examiner

*Primary Examiner* — Lori A Clow
(74) *Attorney, Agent, or Firm* — Oblon, Spivak, McClelland, Maier & Neustadt, L.L.P.

(57) ABSTRACT

There is provided a molecular communication system capable of transmitting an information molecule in which predetermined information is encoded to a target destination under good controllability. The molecular communication system includes a molecular transmitter for transmitting the information molecule with prescribed information encoded, a molecular receiver for receiving the information molecule, and a molecule transmission channel extending between the molecular transmitter and the molecular receiver. The molecule transmission channel defines a transmission path formed of macromolecular (or polymer) materials, along which carrier molecules are circulating in a prescribed direction. The information molecule output from the molecular transmitter is loaded on the carrier molecule and carried to the molecular receiver.

18 Claims, 8 Drawing Sheets

MOLECULAR COMMUNICATION SYSTEM

FIELD OF THE INVENTION

The present invention generally relates to a molecular communication system, and more particularly, to a molecular communication system capable of carrying and transporting information molecules between a molecular transmitter and a molecular receiver via an artificially designed transmission channel with good controllability.

BACKGROUND ART

Molecular communication is inspired by observation of intracellular and intercellular signaling mechanisms mediated by chemical substances (molecules). In molecular communication, nanoscale molecules are used as information carriers in which information is encoded. Molecular communication is expected to create a new communication paradigm based on biochemical reaction stimulated by reception of molecules.

Unlike existing communication technologies that make use of electromagnetic waves (electric signals or optical signals) for information carriers, molecular communication is implemented using biochemical signals at a slow speed with small energy consumption. Molecular communication has high potential of application to nanoscale inter-device communication that cannot use electromagnetic waves for capability reasons or environmental reasons or to operational control of nanomachines that cannot be assembled with or driven by electronic components.

One of the in vivo signaling mechanisms is a vesicular transport using motor proteins named kinesins. Kinesin is about 80 nm long and it carries a substance several times as large as kinesin itself along a fiber-like rail molecule called a microtubule in a living cell. A nanotransport system making use of this biophenomenon is known, in which kinesins carrying an artificial cargo (microbead) move in one direction along a microtubule fixed onto a substrate. See non-patent publication 1 listed below. Another nanotransport system is also known, in which kinesins are fixed into a straight channel formed by lithography and a microtubule moves on the fixed kinesins in one direction. See non-patent publication 2 listed below.

However, these publications only report successful experiments to confirm an artificial unidirectional movement of in vivo molecules, and they do not refer to actual applications at all.

Meanwhile, an information communication system using a biomacromolecule as a communication medium or a recording medium is proposed. See patent-related publication 1 listed below. This system includes a transmission sub-system that converts a message to be transmitted (or written) into sequence information or binding-mode information and combines the sequence information or the binding-mode information with a biopolymer material to produce a synthetic polymer.

When receiving or reading the synthetic polymer at the receiving sub-system, the encoded sequence/binding-mode information is taken out of the synthetic polymer and decoded into a received (or readout) message.

This publication does not describe how the synthetic polymer is transmitted from the transmission sub-system to the receiving sub-system using what kind of transmission channel.

Non-patent Publication 1: R. Yokokawa, et al., "Hybrid Nanotransport System by Biomolecular Linear Motors", Journal of Microelectromechanical Systems, Vol. No. 13, No. 4, pp. 612-619, August 2004

Non-patent Publication 2: Hiratsuka, et al., "Controlling the Direction of Kinesin-driven Microtubule Movements along Microlithographic Tracks", Biophysical Journal, Vol. 81, No. 3, pp. 1555-1561, September 2001

Patent-related Publication 1: JP 2003-101485A

SUMMARY OF INVENTION

Problem to be Solved by the Invention

The present invention aims to reconstruct the molecule-mediated signal transduction mechanism existing in the living world as an autonomously operative communication system under artificial design.

The invention also aims to construct a molecular communication system having directivity using a controllable transmission channel.

Means for Solving the Problem

To solve the problems, in one aspect of the invention, an artificially structured molecule transmission channel is provided between a molecular transmitter and a molecular receiver.

To be more precise, a molecular communication system includes a molecular transmitter that transmits an information molecule in which prescribed information is coded, a molecular receiver that receives the information molecule, and a molecule transmission channel extending between the molecular transmitter and the molecular receiver. The molecule transmission channel includes a transmission path formed of high-polymer (or macromolecular) materials and a carrier molecule moving or circulating in a prescribed direction along the transmission path. The carrier molecule carries the information molecule output from the molecular transmitter, and transports it to the molecular receiver.

With this molecular communication system, the information molecule can be delivered to the destination along the artificially structured transmission path under control.

In an example, the transmission path is structured by rail molecules, and a motor molecule is used as the carrier molecule. In this case, the information molecule is carried on the motor molecule, and transported to the molecular receiver.

In an alternative, the transmission path is structured by motor molecules, and a rail molecule is used as the carrier molecule. In this case, the information molecule is carried on the rail molecule, and transported to the molecular receiver.

In the second aspect of the invention, in a molecular communication system including a molecular transmitter, a molecular receiver, and a molecular transmission channel extending between the molecular transmitter and the molecular receiver, in which system the molecular transmitter has:

a molecule information encoder that encodes prescribed information in a molecule to produce an information molecule:

a labeled molecule generator for generating a labeled molecule used to identify the molecular receiver as a destination of the information molecule; and a molecule emitter for emitting the information coded molecule and the labeled molecule to the molecule transmission channel.

This molecular communication system can transmit an information molecule to the target destination at high reliability. By transmitting a number of information molecules with the same information encoded, the information can be carried to the target destination almost without fail.

In an example, the molecular transmitter includes a first molecule transmission unit having a labeled molecule generator and a first molecule emitter for emitting a labeled molecule, and a second molecule transmission unit having a molecule information encoder and a second molecule emitter for emitting an information molecule.

The second molecule transmission unit may further have a labeled molecule detector for detecting emission of the labeled molecule from the first molecule transmission unit. In this case, the second molecule emitter emits the information molecule based upon the detection of the labeled molecule.

In another example, when the molecular transmitter includes a first molecule transmission unit having a labeled molecule generator and a first molecule emitter for emitting a labeled molecule, and a second molecule transmission unit having a molecule information encoder and a second molecule emitter for emitting an information molecule, the second molecule transmission unit further has a labeled molecule emission instruction unit that instructs the first molecule transmission unit to emit the labeled molecule when the information molecule is emitted. In this case, the first molecular transmission unit emits the labeled molecule based upon the instruction from the second molecule transmission unit.

Advantage of the Invention

A molecular communication system capable of molecule-mediated information propagation with good controllability is realized.

LIST OF REFERENCE SYMBOLS

1, 2: molecular communication system
10, 50: molecule transmission channel
11: substrate
15, 55: information molecule
16: motor molecule
17: rail molecule
18: LDH
19: carrier molecule
20, 60: molecular transmitter
21: molecule supply unit
22: molecule generator
23: molecule supply port
24, 35: molecule reservoir
25, 65: molecule information encoder
26: encoded information protector
27, 67: molecule emitter
30, 70: molecular receiver
31: molecule receiving unit
32: deprotector
33, 72: molecule information decoder
34: molecule processing unit
36: molecule decomposition unit
37: discharge unit
56: labeled molecule
61: labeled molecule generator
62: information molecule generator
64: labeled molecule storage
66: information molecule storage
68: labeled molecule detector
69: labeled molecule emission triggering unit
71: labeled molecule receiving unit

BEST MODE FOR CARRYING OUT THE INVENTION

Preferred embodiments of the invention are now described in conjunction with the attached drawings.

FIG. 1 through FIG. 6 illustrate a molecular communication system according to the first embodiment of the invention. In the first embodiment, an artificial transmission channel is structured using motor molecules and rail molecules in the molecular communication system.

Figure 1:
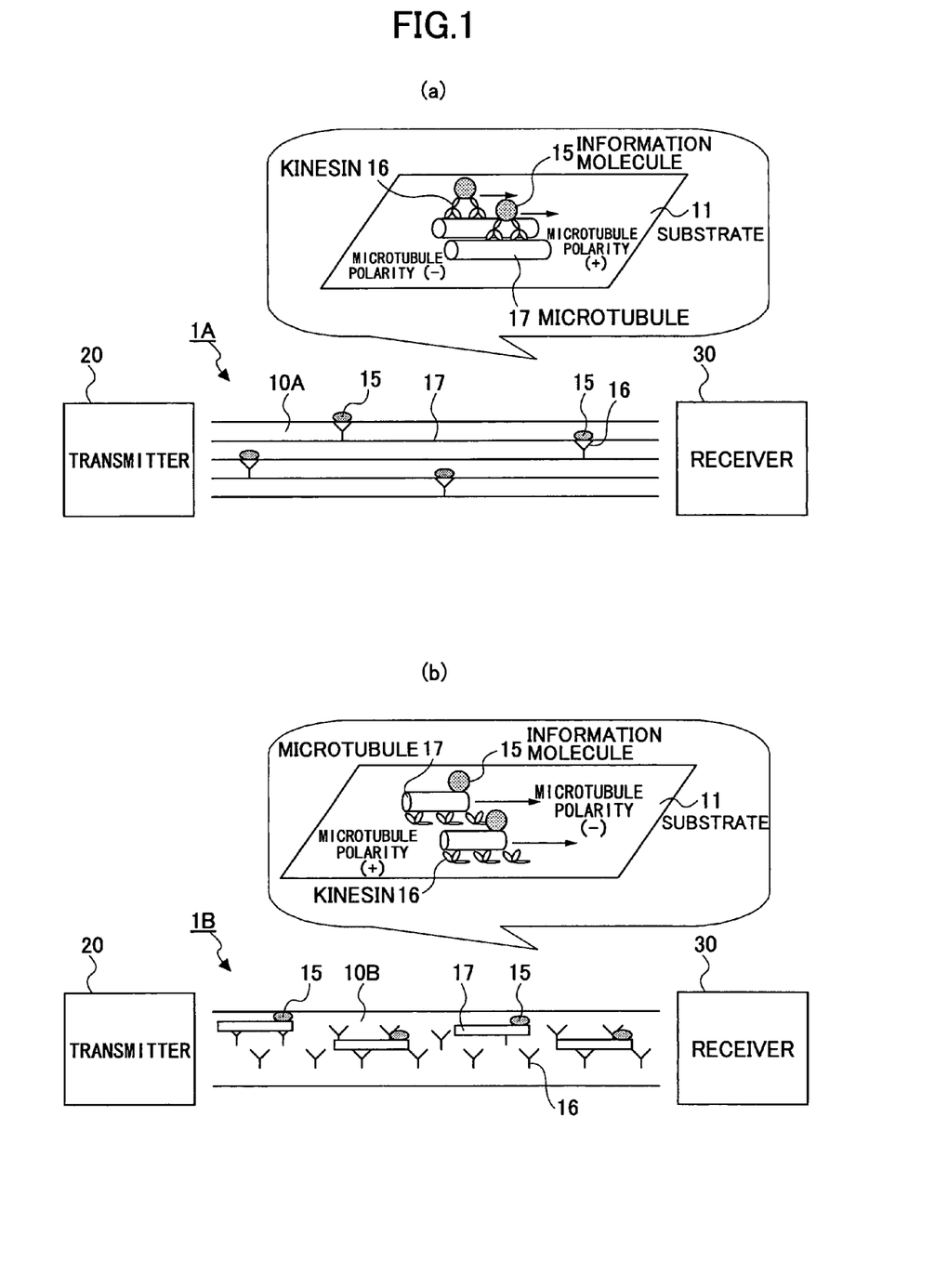
FIG. 1 is a schematic diagram for explaining the basic idea of a molecular communication system according to the first embodiment of the invention.

FIG. 1 is a schematic diagram illustrating the basic idea of the molecular communication system of the first embodiment. The molecular communication system 1 includes a molecular transmitter 20, a molecular receiver 30, and a molecule transmission channel 10 extending between the molecular transmitter 20 and the molecular receiver 30. In the example illustrated in FIG. 1($a$), rail molecules are arranged between the molecular transmitter 20 and the molecular receiver 30 to define the molecule transmission channel 10A. A motor molecule 16 carries an information molecule 15 and moves along the rail toward the molecular receiver 30.

The rail molecules 17 are microtubules in this example. Kinesins or dyneins can be used as the motor molecules 16, depending on the direction of movement. The moving direction of the motor molecule 16 is determined by the polarity of the microtubule 17. It is known that most of kinesins move toward the plus end of the microtubule 17 and dyneins move toward the minus end of the microtubule 17.

To form the molecule transmission channel 10A by rail molecules 17, microtubules 17 are fixed onto a glass substrate 11. Because the microtubule 17 has insufficient affinity with a glass surface, amino acid (Poly-L-Lysine: PLL) is used as bonding adhesive. For example, a resin film (not shown) in which a slit or a groove defining a transmission path is formed is placed onto the glass substrate 11, and the slit is filled with PLL. Then, excess PLL is rinsed off, and the resin film is removed. When a rail molecule solution (e.g., microtubule solution) is introduced onto the glass substrate 11, rail molecules 17 adhere only to the PLL-coated portions.

In contrast, in the example shown in FIG. 1(b), motor molecules 16 are arranged onto the glass substrate 11 to form a molecule transmission channel 10B between the molecular transmitter 20 and the molecular receiver 30. In this arrangement, a microtubule 17 (as an example of the rail molecule) carries an information molecule 15 along the transmission path formed by motor molecules 16.

To form the molecule transmission channel 10B, a resist film is placed onto the glass substrate 11 and is patterned by, for example, photolithography so as to form an opening pattern defining a path. Motor molecules 16 are injected into the groove formed in the resist film and adsorbed onto the glass substrate 11.

The systems shown in FIG. 1(a) and FIG. 1(b) are theoretically equivalent. In the example shown in FIG. 1(a), a motor molecule 16 serves as a carrier for carrying the information molecule 15, while in the example shown in FIG. 1(b) a rail molecule 17 serves as a carrier. Accordingly, the motor molecule 16 and the rail molecule 17 are collectively referred to as a "carrier molecule 19" in the following descriptions.

In FIG. 1(a) and FIG. 1(b), the rail molecule 17 is not limited to a microtubule, and it may be an actin filament. In this case, myosin may be used as the motor molecule, in place of kinesin or dynein. The transmission channel 10 is not necessarily fixed onto the glass substrate 11, and a fiber-like channel may be used.

Figure 2:
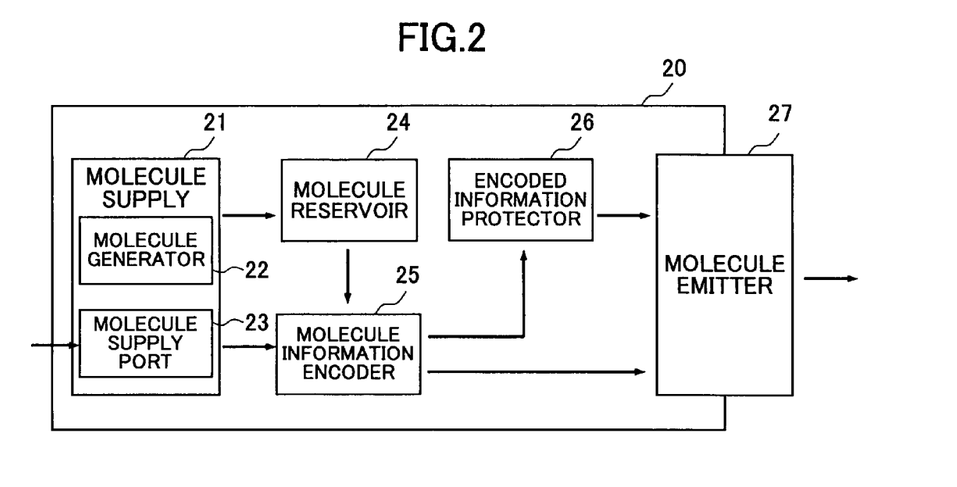
FIG. 2 is a schematic block diagram illustrating an example of the molecular transmitter used in the molecular communication system shown in FIG. 1.

FIG. 2 is a schematic block diagram of the molecular transmitter 20 used in the molecular communication system 1 shown in FIG. 1. The molecular transmitter 20 produces and emits an information molecule to the molecule transmission channel 10. The molecular transmitter 20 has a molecule supply unit 21, which unit includes at least one of a molecule generator 22 for internally generating molecules and a molecule supply port 23 for externally introducing molecules. A molecule reservoir 24 temporarily stocks the molecules generated by the molecule generator 22 or externally supplied through the molecule supply port 23. A molecule information encoder 25 encodes information to be transmitted in a molecule. An encoded information protector 26 performs protection treatment for protecting the information-coded molecule from the propagation environment. A molecule emitter 27 emits the information coded molecule (optionally protected) from the molecular transmitter 20 to the molecule transmission channel 10.

Figure 3:
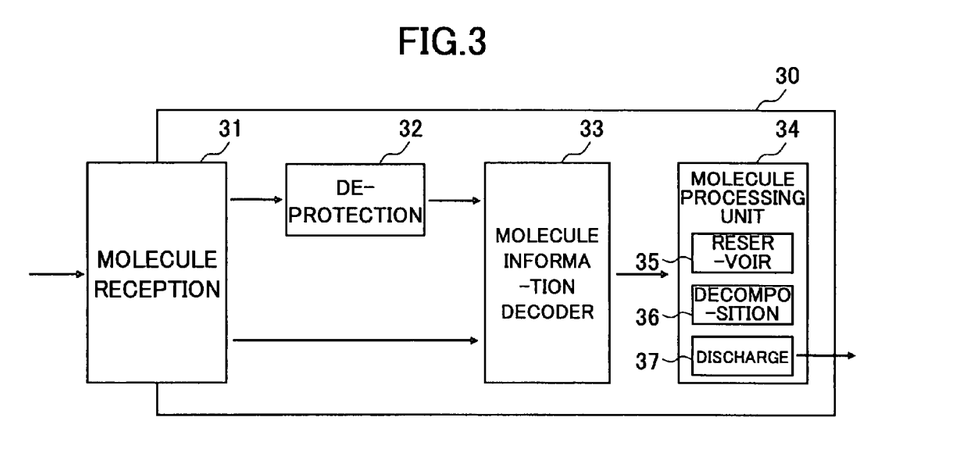
FIG. 3 is a schematic block diagram illustrating an example of the molecular receiver used in the molecular communication system shown in FIG. 1.

FIG. 3 is a schematic block diagram of the molecular receiver 30 used in the molecular communication system 1 shown in FIG. 1. The molecular receiver 30 receives the informational molecule sent from the molecular transmitter 20, and decodes the information. A molecule receiving unit 31 captures information molecules carried along the molecule transmission channel 10 and takes them into the molecular receiver 30. A deprotector 32 removes the protection if the received information molecule is protected. A molecule information decoder 33 decodes or interprets the encoded information. A molecule processing unit 34 either stores or decomposes the molecules, and emits the molecules (or decomposed molecules) outside the molecular receiver 30.

In operation, DNA cloning is performed on the molecules in the molecular transmitter 20. The molecules are stocked in the molecule reservoir 24 or externally supplied via the molecule supply port 23, for recombination of synthetic or native DNAs to produce a single-stranded or double-stranded DNA having a base sequence consisting of adenines (A), guanines (G), thymines (T), and cytosines (C). The base sequence represents the information to be transmitted. Alternatively, a single-stranded or double-stranded DNA with a specific structure (such as a hairpin structure or a bulge structure) may be used to represent the information to be transmitted. Such DNA generation or manipulation may be performed on a microchip, as performed in micro PCR (polymerase chain reaction). See K. Sun, et al., "Fabrication and Evaluation of the All Transparent Micro-PCR Chip", Technical Report of IEICE, MBE 2003-40, pp. 1-4, July 2003.

For example, a sequence CGA is mapped to a letter "A", a sequence CCA is mapped to "B", and a sequence GTT is mapped to "C".

Alternatively, a hairpin structure may be mapped to digital data "0", and a bulge structure may be mapped to digit "1".

To produce encoded information, a great quantity of DNAs with various sequences or configurations may be produced in advance outside the molecular transmitter 20 using a DNA recombination technique and stored in the molecule reservoir 24 through the molecule supply port 23. In this case, desired DNAs representing specific information to be transmitted are selected from the molecule reservoir 24 and emitted to the molecule transmission channel 10.

The information to be transmitted is not limited to the artificially produced analog or digital information, but includes the DNA's life information itself and/or a gene for medical treatment of disordered cells.

An information molecule is produced using the information coded DNA as a data section and by binding a single-stranded DNA, which is used as a binder between the information molecule and a carrier molecule, to the data section.

Figure 4:
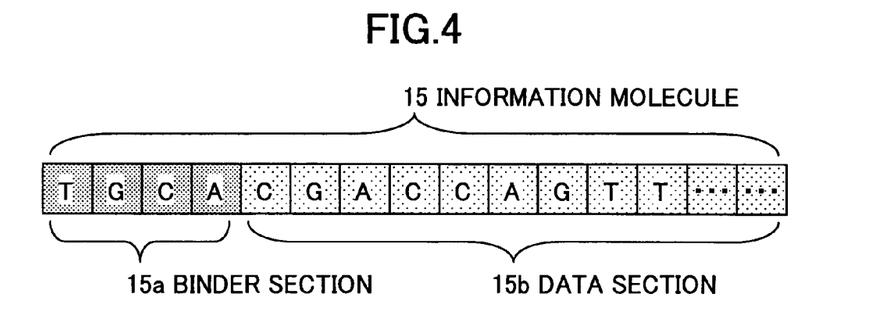
FIG. 4 is a schematic diagram illustrating an example of the data structure of the information molecule transmitted in the molecular communication system shown in FIG. 1 (SEQ ID NO: 1)

FIG. 4 is a schematic diagram illustrating the data structure of an information molecule (which is a DNA in this example). The information molecule 15 has a binder section 15a and data section 15b representing information to be transmitted. The binder section 15a is used to bind the information molecule 15 to a carrier molecule (a motor molecule 16 or a rail molecule 17) moving along the molecule transmission channel 10 toward the molecular receiver 30.

Figure 5:
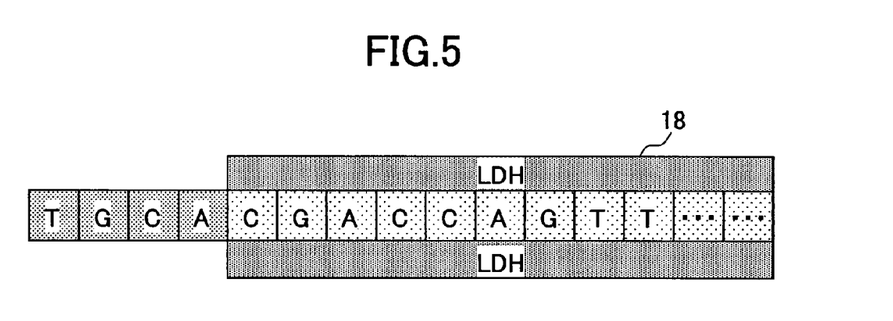
FIG. 5 is a schematic diagram of the information molecule with the protected data section (SEQ ID NO: 1)

In order to protect the information molecule 10 from the environmental factors, such as temperature, pH, degrading enzyme and ionic strength of the molecule transmission channel 10, or light that may cause denaturalization of molecules, the data section 15b may be coated with layered double hydroxide (LDH) 18, which substance is an inorganic compound, at the encoded information protector 26, as illustrated in FIG. 5. LDH coating can be carried out by taking the encoded DNA chain in between LDH layers to be encapsulated. The detailed process and the effect of LDH coating are described in J. H. Choy, et al., "Inorganic-Biomolecular Hybrid Nanomaterials as a Genetic Molecular Code System," Advanced Material, 16, No. 14, pp. 1181-1184, Jul. 19, 2004.

Figure 6:
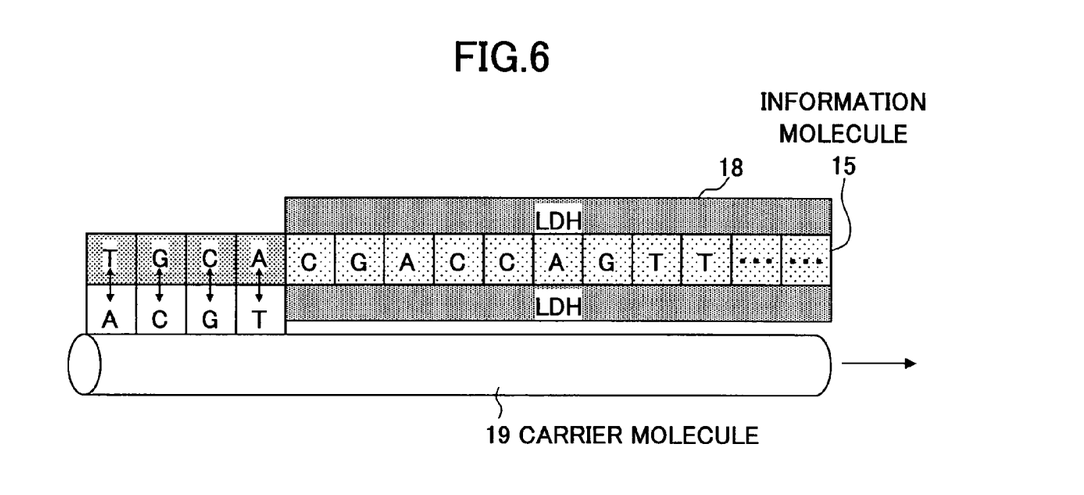
FIG. 6 is a schematic diagram of the information molecule bound to and carried by a carrier molecule (SEQ ID NO: 1)

The generated and protected information molecule (DNA, for example) 15 is emitted from the molecular transmitter 20 via the molecule emitter 27. The information molecule 15 may be emitted in accordance with the circulating timing of the carrier molecule, using an openable and closable gate (such as an ion channel) and a timer. The emitted information molecule 15 stays near the molecule transmitter 20, and is coupled to a carrier molecule 19 through hybridization between the binder section 15a of the information molecule 15 and a complementary single-stranded DNA base sequence provided on the surface of the carrier molecule 19. In this operation, the timer is not indispensable because the carrier molecule 19 is circulating along the molecule transmission channel 10, and because the emitted information molecule 15 is bound to the carrier molecule 19 after a certain period of time as long as the information molecule 15 stays near the molecular transmitter 20.

The carrier molecule 19 is circulating along the transmission path defined by rail molecules 17 or the motor molecules 16 fixed on a substrate 11 in a solution containing adenosine triphosphate (ATP). The moving rate of the carrier molecule 19 is controllable by adjusting the ATP concentration, magnesium ion concentration, temperature, and/or the viscosity resistance of the solution. Making use of this adjustability, the circulation cycle of the carrier molecule 19 and the information molecule emission cycle of the molecule transmitter 20 can be synchronized with each other.

In place of the circulating mechanism, carrier molecules 19 may be put nearby the molecular transmitter 20 placed in a solution without containing ATP. When the information molecule 15 is bound to a carrier molecule 19, a prescribed amount of ATP that allows the carrier molecule 19 to carry the information molecule 15 to the molecular receiver 30 is added to the solution to start the transportation.

The carrier molecule 19 carrying the information molecule 15 moves on the rail molecules 17 (or the motor molecules 16) of the molecule transmission channel 10 formed on the substrate 11 toward the molecular receiver 30.

At the molecular receiver 30, the molecule receiving unit 31 applies restriction enzyme to the carrier molecule 19 and the information molecule 15 to cut the duplex (double strand) functioning as the binder between the information molecule 15 and the carrier molecule 19, and takes the separated information molecule 15 inside the molecular receiver 30.

If the data section 15b of the information molecule 15 captured into the molecular receiver 30 is LDH-coated, the deprotector 32 removes the LDH coating by introducing the information molecule 15 into a solution with pH 3 or below. The detailed method for taking a DNA out of the LDH coating is also described in J. H. Choy, et al.

Then, the molecule information decoder 33 reads the base sequence of the data section 15b of the information molecule 15 for data decoding. A general method for reading the base sequence is using polymerase chain reaction (PCR) and gel electrophoresis. The base sequence may also be read by detecting change in electric current when DNAs pass through the nano-scaled pores (nanopores). See T. A. Goor, "Nanopore Detection: Threading DNA through a Tiny Hole," PharmaGenomics, pp. 28-30, March/April 2004.

Instead of directly reading the base sequence, the encoded information may be interpreted by observing the biochemical reaction (such as generation of proteins) occurring upon appearance of the DNA taken into the molecular receiver 30.

When the information is decoded or interpreted, some other process is performed at the molecule processing unit 34. To recycle the information molecule, it is stored in the reservoir 35. To consume the information molecule, it is decomposed at the decomposition unit 36. To discharge the information molecule outside, it is emitted from the molecular receiver 30 through the discharge unit 37.

Next, explanation is made of a modification of the first embodiment.

(Information Coding and Decoding)

In the above-described example, a DNA is used as the information molecule 15, and information is mapped to the base sequence or the structure of the DNA. However, there are many other coding methods depending on the type of molecule used as the information molecule.

For example, it is known that the azobenzene changes its structure from cis configuration to trans configuration upon irradiation of light with wavelength of 380 nm, and that it returns from the trans configuration back to the cis configuration upon irradiation of light with wavelength of 450 nm (photoisomerization). There are several other molecules having similar optical activity. Polysilane changes the winding direction of helix from the right to the left, and vice versa, under external energy, such as temperature or existence of chemical substances. By making use of these phenomena, information may be coded by mapping one state to "0" and mapping the other state to "1".

Existence of several tens of thousands of conformational diversities of protein is also useful for coding. For example, a certain information item may be mapped to a protein group defining a family with very similar amino acid sequences or conformations. In this case, even if the protein molecules get slightly denatured during the transmission due to the environmental change between the molecular transmitter 20 and the molecular receiver 30, the information can be maintained without undesirable lost as long as such occurrence of denaturation is within the same protein group. This arrangement can enhance environmental tolerance in information coding.

Information can also be coded making use of the conformations of molecules. For example, a variety of nanostructures formed by self-assembly of metallic atoms and organic molecules can be used. It is known that by appropriately designing the type, the numbers, and the location of the atoms of a molecule being used as a component of the structure, a complicated nanostructure (such as a square, a tetrahedron, a hexahedron, an octahedron, a tube, a box, an infinity sign, or a puzzle ring) that does not exist in the natural world can be synthesized at 100% yield. Accordingly, a coding method for mapping information to such nanostructures can be employed.

When employing a coding method making use of conformational diversities of a molecule, it is necessary for the receiver to read the conformations by, for example, nuclear magnetic resonance (NMR) or X-ray analysis.

Another possible method is to encode information making use of the nature of a molecular structure, such as polarity, oscillation, or intensity. Still another method is using a variety of sizes of latex beads filled with semiconductor nanocrystals (quantum dots) as information molecules. In this case, the composition of the quantum dots in the bead is used as an information code.

When using quantum dot beads, fluorescence emitted from the various sizes of quantum dots in a latex bead is observed by prism spectroscope to acquire spectrum patterns having different wavelengths and intensities defined by the compositions of the quantum dots. Theoretically, there are a billion patterns, and therefore, information can be coded making use of spectrum patterns.

On the other hand, the existence of a molecule itself can be information, without performing specific manipulation on the molecule. For example, it is known that a certain chemical substance, such as a pheromone, affects the feeling or the behavior of an addressee (or a recipient) who receives the molecule. In this case, the appearance of the molecule itself works as a code, and the reaction caused at the recipient is decoding. Concerning protection or encapsulation of molecules, membrane vesicles can be used, other than LDH coating, to encapsulate an information molecule inside it. Because many information molecules can be encapsulated in the same membrane vesicle, information can be mapped to the concentration of the information molecules or the component ratio of different types of information molecules in the membrane vesicle. A chemical substance, such as a pheromone, gives stronger effect to a recipient as the amount of received molecules increases. When concentrations or component ratios of molecules are used as codes, the degree of reaction caused at the recipient indicates the decoding result. In place of membrane vesicles, any suitable molecular capsules made of organic or inorganic molecules may be used to encapsulate information molecules.

(Binding and Separation of Information Molecule and Carrier Molecule)

In the previous example, a DNA is used as the information molecule 15, and the information molecule is bound to the carrier molecule making use of DNA hybridization. There are, however, many other binding methods depending on the type of molecules used as the information molecules.

For example, a receptor may be bound to the surface of the carrier molecule 19 to capture and carry the information molecule 15 (such as a protein molecule) emitted from the molecular transmitter 20 based upon its molecule recognition capability. Because tailor-made receptors can be synthesized artificially, a variety of information molecules can be transmitted using carrier molecules. In addition, since a receptor is also attachable to the surface of a membrane vesicle, the information molecule 15 encapsulated in a membrane vesicle can be loaded on a carrier molecule 19 by providing a receptor-ligand molecule to the carrier molecule 19. Because various types of molecules can be encapsulated in the same membrane vesicle, it is unnecessary to prepare different types of receptors depending on the types of information molecule 15 when carrying a variety of information molecules 15. In this case, the membrane vesicle corresponds to an envelope, and the information molecules 15 correspond to a letter. The membrane vesicle not only protects the information molecules 15 from environmental factors such as light, temperature, pH, degrading enzyme, or ionic intensity of the transmission channel 10, that may denaturalize the molecule, but also hides the property of the information molecule 15 from the carrier molecule 19 to conduct stable transmission regardless of the type of information molecules 15.

In addition, by bonding cyclodextrin or crown ether to the surface of carrier molecules, information molecules can be loaded on and carried by the carrier molecules making use of the molecule inclusion ability to fetch a molecule or an ion fit to the ring size. In this case, the information molecule 15 carried to the molecular receiver 30 can be unloaded from the carrier molecule 19 by external stimulation, such as irradiation of light.

In still another method, the information molecule 15 emitted from the molecular transmitter 20 can be bound to the carrier molecule 19 by phosphorylating the information molecule 15 using phosphoenzyme. At the molecular receiver 30, the information molecule 15 can be separated from the carrier molecule 19 by dephosphorylation using dephosphoenzyme.

(Giving Address Information)

The previous examples have been described on the assumption that a single molecular receiver 30 is used. The first embodiment is applicable to a more advanced molecular communication system involving multiple molecular receivers 30 having different receptors.

In this case, each of the molecular receivers 30 has a different receptor, and the molecular transmitter 20 emits a molecule that works as a ligand for any one of the receptors. The ligand output from the molecular transmitter 20 is bound to a carrier molecule 19, and after propagation, the carrier molecule 19 is captured by the associated molecular receiver 30 that has a receptor corresponding to the ligand. By binding a ligand molecule representing address information, together with the information molecule 15, to a carrier molecule 19, the information molecule can be transmitted to a specific molecular receiver 30 in a reliable manner among the multiple molecular receivers 30.

(Applications)

(1) Large Volume Information Transmission

When using DNAs as information molecules, a large volume of information can be transmitted using a single molecule.

(2) Fuel Transportation

By using hydrogen as information molecules, energy supply to a fuel battery can be achieved. By transmitting protons (hydrogen ions) as information molecules, energy supply to a molecular rotary motor is achieved.

(3) Pseudo-Substance Transmission

By transmitting minimum necessary substances, such as enzymes or DNAs, as information molecules, biochemical reaction such as self assembly can be caused at the receiver side to produce the same substance as that of the transmission side.

(4) μ-TAS (Micro Total Analysis System)/Lab-on-a-Chip

μ-TAS or lab-on-a-chip is a micro system in which microscopic components, such as pumps, valves, sensors, or reactors, are integrated on a chip such that biochemical analysis or synthesis can be performed on the chip. In this application, various types of samples and chemicals (reagents) can be transmitted as information molecules to the respective components.

(5) Molecular Computer

Information molecules such as enzymes can be transmitted as input/output signals or control signals to various computing devices made of molecules, such as molecular transistors, molecular logic gates, or molecular memories.

(6) Communications and Control for Nanomachines

The above-described structure is suitably applied to communications between nanoscale devices that do not allow electromagnetic waves to be used due to the limited capability or environmental reasons. It is also applicable to operational control for nanomachines that cannot be structured or driven by electronic devices.

Next, the second embodiment of the molecular communication system is described in conjunction with FIG. 7 through FIG. 12. In the second embodiment, the transmission channel may be structured as an in vivo molecule signaling pathway, such as a blood vessel or a lymph vessel.

Figure 7:
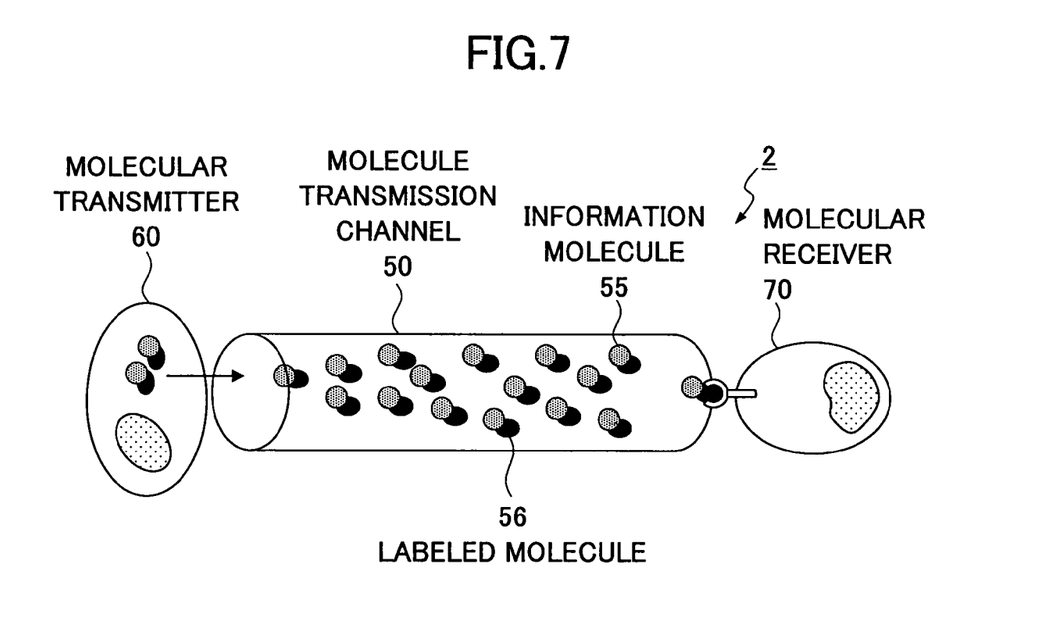
FIG. 7 is a schematic diagram for explaining a molecular communication system according to the second embodiment of the invention.

FIG. 7 is a schematic diagram of a molecular communication system 2 according to the second embodiment. The molecular communication system 2 includes a molecular transmitter 60, a molecular receiver 70, and a molecule transmission channel 50 extending between the molecular transmitter 60 and the molecular receiver 70. The molecular transmitter 60 encodes information in molecules to generate information molecules 55, and outputs the information molecules 55, together with labeled molecules 56 that serve as address indicators. The information molecules 55 and the labeled molecules 56 are transmitted through the molecule transmission channel 50 to the molecular receiver 70. The molecular receiver 70 receives the information molecules 55 and the labeled molecules 56, and decodes information from the information molecules 55.

The molecular transmitter 60 is created by genetically altered mutant cell and furnishing the information coding ability so as to produce and output information coded molecules 55 and labeled molecules 56. Alternatively, the molecular transmitter 60 may be produced artificially using inorganic mechanical components. The molecules for information coding and labeled molecules are not necessarily produced inside the molecular transmitter 60, and instead, they may be stored in advance in the molecular transmitter 60 in an artificial manner. It is sufficient for the molecular transmitter 60 to have at least the capability for encoding information in molecules and outputting the information coded molecules.

The labeled molecules 56 are, for example, hormones or neurotransmitters, and are selectively received at specific receptors. The molecules to be coded are living molecules, such as proteins or DNAs. As to the molecular structure, each of the molecules used in information coding has a binder site capable of connecting itself to a labeled molecule located nearby. The details of the coding method will be described below.

The molecule transmission channel 50 is an in vivo molecule signaling path, such as a blood vessel or a lymph vessel, through which pairs of information molecules 55 and labeled molecules 56 are transmitted from the molecular transmitter 60 to the molecular receiver 70. Any suitable channel, other than a blood vessel or a lymph vessel, may be used as the molecule transmission channel 50 as long as the pairs of information molecules 55 and the labeled molecules 56 are transported. For example, an arbitrary secretion pathway, or an artificial flow path along which motor molecules serving as carrier molecules move as in the first embodiment may be used.

The molecular receiver 70 is, for example, a living cell having a receptor for receiving the labeled molecule 56, or an artificial cell produced by altering the living cell. The molecular receiver 70 takes the combination of the information molecule 55 and the labeled molecule 56 inside, and decodes the information coded in the information molecule 55. Examples of the decoding method and the encoding method are described below. It should be noted that the molecular receiver 70 is not limited to a living cell or an artificial cell derived from the living cell, but includes an artificial receiver structured by inorganic mechanical components. In either case, such a cell has a receptor for receiving the labeled molecule 56, and a function for decoding the information coded in the information molecule 55.

One of the simplest encoding methods employed at the molecular transmitter 60 is mapping molecule A and molecule B to code "0" and code "1", respectively, and transmitting one of the molecules depending on the information. The molecule A and the molecule B may be totally different from each other, or alternatively, molecule B may be produced by causing a certain chemical reaction (such as phosphorylation or ubiquitination) in the molecule A to change the property of the molecule. When the molecule transmitter 60 is formed of a living cell or a mutant cell derived from the living cell, signaling molecules emitted from the living cell may be selectively used as molecule A or molecule B. In this case, information molecules can be output from the molecular transmitter 60 by simply producing and selecting the signaling molecules. If the molecular transmitter 60 is structured by mechanical components, a clock-based opening/closing gate may be used to control the emission of information molecules synchronized with generation and encoding of the molecules. If the information molecule does not have to be transmitted immediately after the generation and the encoding of the molecules, it is unnecessary to keep synchronization between generation of the information molecules and emission of the information molecules. In this case, a constant-timing opening/closing gate may be used in the molecular transmitter with a simpler structure.

In decoding at the molecular receiver 70, two types of receptors are provided to the molecular receiver so as to correspond to the information molecules A and B, respectively, and it is determined which receptor receives the transmitted information molecule to decode the information. This determination can be made by monitoring and measuring the effect caused in the molecular receiver 70 as a result of reception of the information molecule at the receptor. Such reaction includes, for example, change in the configuration of the molecular receiver, and emission of a chemical substance due to reception of the information molecule. In place of digital data "0" and "1", the effect or the reaction caused at the molecular receiver itself may be used as information to be transmitted. In this case, generation of a molecule having a certain type of reaction causing capability corresponds to information coding at the molecular transmitter 60, and occurrence of a desired reaction at the molecular receiver 70 corresponds to information decoding. In this arrangement, the desired effect itself may be information to be transmitted. Such a molecular transmitter can be realized by genetically altering a eukaryotic cell, and by making use of an external stimulation susceptive mutant cell capable of ON/OFF controlling emission of molecules or changing the type and/or concentration of molecules to be emitted according to external stimulation, such as temperature change or irradiation of light. The molecular receiver is realized by making use of a living cell itself.

Another example of the encoding and decoding method is to make use of an arbitrary type of diazapentafen having either a right-hand helix or a left-hand helix as the information molecule. In this case, the right-hand helix and the left-hand helix may be mapped to information "0" and "1", respectively. By controlling the direction of the helix according to information to be transmitted, information coding can be realized. Because the direction of the helix of this type of molecule can be controlled using circularly polarized light, information coding can be achieved by irradiating either right-handed circularly polarized light or left-handed circularly polarized light. The details of the control of the direction of helix by irradiation of circularly polarized light are described in TANAKA, Yasutaka, "Study for Synthesis and Physical Property of New Optically-Active Aromatic Molecule Seeking Molecular Memory", Shizuoka University Venture Business Laboratory Research and Development Project Report, 2000.

It is also known that the direction of the helix can be read using circular dichroic spectrum, and therefore, this phenomenon can be used to decode information at the molecular receiver 70. It should be noted that the encoding and decoding techniques using circularly polarized light or spectrum can be applied to a mechanically structured molecular transmitter or receiver, but the applicability to a living cell derived transmitter or receiver is low because of the difficulty of generating circularly polarized light or spectrum.

In place of the encoding and decoding of information making use of the existence or the structure of molecules themselves, arbitrary encoding and decoding methods can be employed. For example, DNA can be used as the molecule to be encoded to represent coded information by the base sequence, as described in the first embodiment. Alternatively, amino acid can be used as the molecule to be encoded to represent coded information by means of amino acid sequence, as described in Japanese Patent Application Laidopen publication No. 2003-101485. Certain types of protein or DNA are subjected to enzymatic degradation in blood, and in this case, it may be desired to use a flow path other than a blood vessel for the molecule transmission channel 50. However, by encapsulating the DNA by LDH coating or other suitable methods as in the first embodiment, or by protecting information molecules by membrane vesicles, these information molecules can be transmitted through a blood vessel.

Instead of encoding information in a single molecule, coded information may be represented by the concentration of molecules using multiple molecules. For example, using a total of one hundred (100) molecules A and B, existence of 70% or more of molecules A represents information "0", while existence of 70% or more of molecules B represents information "1". This arrangement is advantageous because even if some of the molecules lose their property due to chemical reaction or bonding to other molecules in the molecule transmission channel 50, information can be decoded at the molecular receiver 70 as long as at least a prescribed number of molecules reach the molecular receiver 70. In other words, information error due to the influence of the molecule transmission channel 50 can be reduced. If, at the molecular receiver 70, the concentrations of both molecules A and molecules B are less than 70%, this fact can be used as information error. In this case, retransmission request for the information molecules can be sent from the molecular receiver 70 to the molecular transmitter 60 to improve the communication reliability. This type of molecular transmitter can be realized by using an above-described external stimulation susceptible mutant cell capable of switching emission of molecule A and molecule B according to external stimulation (such as temperature change or irradiation of light), and by adjusting the quantity of nutrient for controlling the entire amount of molecules to be generated.

The molecule protection mechanism for encapsulating molecules in a membrane vesicle described in the first embodiment can also be used to map information to a concentration of the molecules or composition of different types of molecules in the membrane vesicle. This arrangement is advantageous because the information error rate is greatly reduced due to the protection of the information molecules in the membrane vesicle. Information can be decoded by monitoring or measuring the intensity of the effect caused at the molecular receiver 70, as described in the first embodiment. In place of mapping information to digital signals "0" and "1", type and intensity of reaction to be caused at the molecular receiver 70 may be used as information. In this case, reaction inducing molecules are generated at the molecular transmitter 60, and information encoding is performed by encapsulating the molecules at prescribed concentration or composition so as to cause a desired reaction at a desired intensity. Information decoding is occurrence of the desired reaction at the desired intensity at the molecular receiver 70. To encapsulate the information molecules at a desired concentration or composition, the phenomenon that the concentration or composition of the information molecules in a membrane vesicle becomes the same as those in the environment when producing the membrane vesicle can be utilized. Accordingly, prior to producing the membrane vesicle, the concentration or the composition of information molecules inside the molecular transmitter 60 is set to a desired level by controlling the quantity of molecules to be generated.

Operations and the structure of the molecular communication system 2 illustrated in FIG. 7 are now described based upon an example of encoding and decoding information making use of the concentration of information molecules 55.

Figure 8:
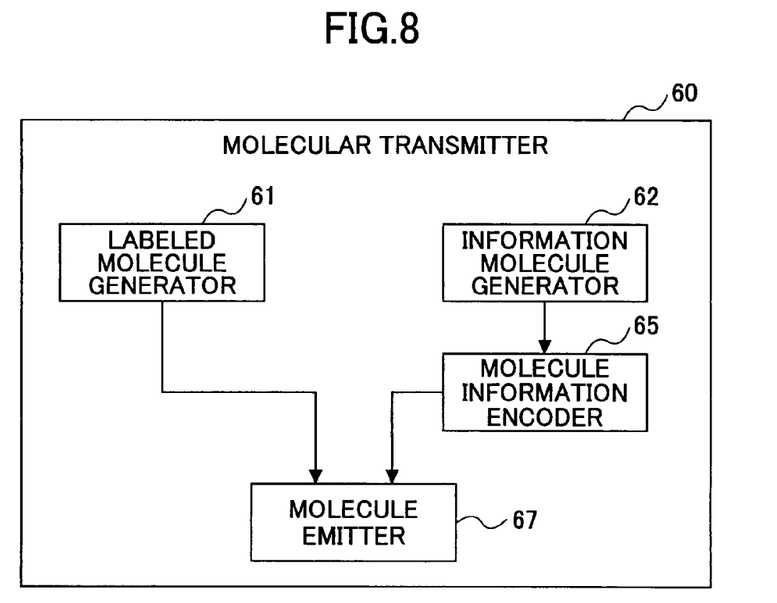
FIG. 8 illustrates a first example of the molecular transmitter used in the molecular communication system shown in FIG. 7.

FIG. 8 illustrates the first example of the molecular transmitter 60 shown in FIG. 7. The molecular transmitter 60 has a labeled molecule generator 61, an information molecule generator 62, a molecule information encoder 65, and a molecule emitter 67. The labeled molecule generator 61 generates labeled molecules 56, such as hormones or neurotransmitters. This component corresponds to the ribosome in a living cell. The information molecule generator 62 produces molecules, such as proteins, to be encoded, and this component also corresponds to the ribosome of a living cell. To discriminate between generation of molecules to be encoded and generation of labeled molecules, the molecule generator 62 is called an "information molecule generator 62" for the sake of convenience.

Figure 9:
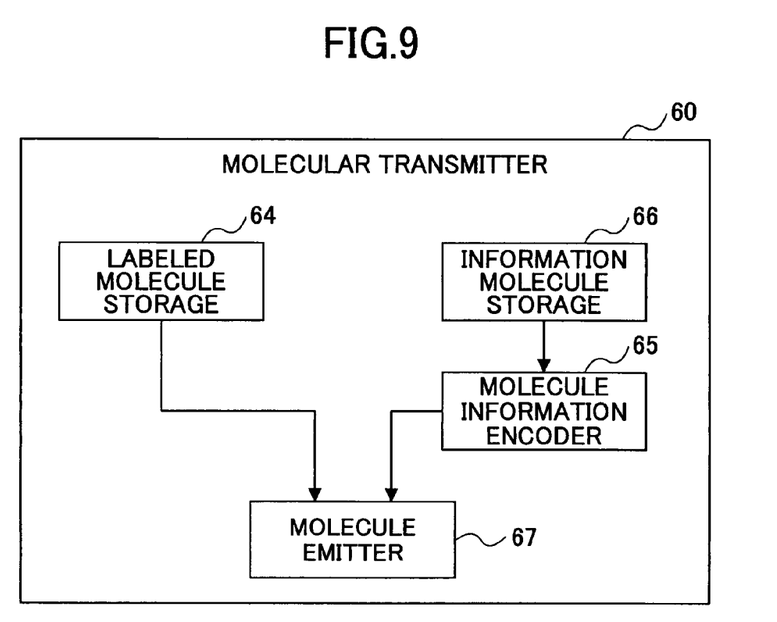
FIG. 9 illustrates a second example of the molecular transmitter used in the molecular communication system shown in FIG. 7.

If molecules to be encoded are stored in advance, instead of producing them in the molecular transmitter 60, the structure shown in FIG. 9 may be employed. In this case, the molecular transmitter 60 has a labeled molecule storage 64 and an information molecule storage 66, in place of the labeled molecule generator 61 and the information molecule generator 62, respectively. Both the information molecule generator 62 and the information molecule storage 66 serve as molecule supply source in terms of supplying molecules to be encoded.

The molecule information encoder 65 encodes information in the produced or stored molecules to generate information molecules 55. The information molecules 55 are emitted, together with the labeled molecules 56, from the molecule emitter 67.

It is assumed that the molecular transmitter 60 is implanted near the pancreas of a living body, and that biological information, such as temperature or viscosity of body fluid, acquired by a sensor (not shown) connected to the molecular transmitter 60 is constantly transmitted to a molecular receiver 70 implanted near the liver of the living body. To transmit the information collected by the sensor to the molecular receiver 70, the labeled molecule generator 61 triggered by the input information from the sensor to generate insulin as the labeled molecule, which molecule is a hormone targeting the liver cell.

On the other hand, the information molecule generator 62 (or the information molecule storage 66) is triggered by the input information from the sensor to generate protein molecules (molecules A) having a structure combinable with insulin, and outputs them as the molecules to be encoded.

It is assumed that, based upon the sensor information, one hundred labeled molecules (insulin molecules) and one hundred molecules A used to generate information molecules are output, and that the information detected by the sensor is temperature. If the detected temperature is higher than 36.5 degrees C., that information is mapped to "0", and if the temperature is at or below 36.5 degrees C., the information is mapped to "1". When mapping to "0", the percentage of phosphorylated molecules A is set at or above 70%, and for mapping to "1", the percentage of ubiquitinated molecules A is set at or above 70%. If the detected temperature is 36 degrees C., the molecule information encoder 65 applies ubiquitin to molecules A to ubiquitinate most part of the molecules A to produce code "1". The threshold is set at 70% because ubiquitin may not act on a portion of the molecules A.

The generated insulin serving as the labeled molecules and the information coded molecules A are emitted from the molecule emitter 67. Because the molecule A has a site easy to combine with insulin, insulin and molecules A may be combined with each other before they are emitted from the molecule emitter 67. Of course, the combination of insulin and a molecule A may be formed after the emission from the molecular transmitter 60, depending on the situation. It is desired to design the information molecules A such that the binding site with the labeled molecules is not adversely affected by the encoding process through phorylation or ubiquitination so as not to prevent binding between the labeled molecule and the information molecule.

Insulin is bound to molecules A at a site different from the site used to be combined with the molecular receiver 70 (or its receptor). The system is also designed such that the binding site between the information molecules A and insulin does not affect the rest of the part to avoid the situation where the insulin may not be received at the molecular receiver 70.

The molecules (that is, combinations of information molecules A and insulin) output from the molecular transmitter 60 are transferred through the blood vessel, which is an in vivo signal flow path, to the target cell having an insulin receptor and located near the liver. An anti-insulin antibody may be added to the information molecules A prior to be output from the molecule emitter 67 of the molecular transmitter 60 to protect the information molecule A from degradation or other influence in the molecule transmission channel 50.

Figure 10:
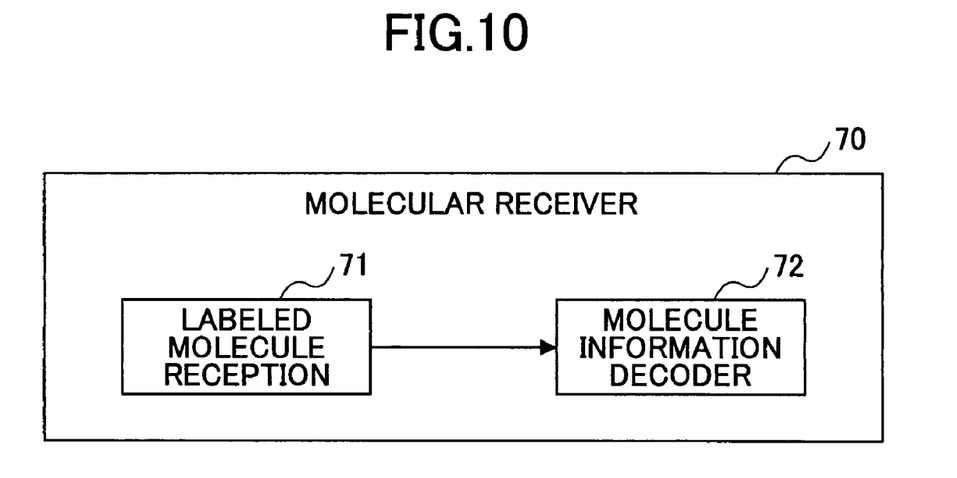
FIG. 10 illustrates an example of the molecular receiver used in the molecular communication system shown in FIG. 7.

FIG. 10 illustrates an example of the molecular receiver 70 used in the molecular communication system 2 shown in FIG. 7. The molecular receiver 70 has a labeled molecule receiving unit 71 and a molecule information decoder 72. The labeled molecule receiving unit 71 receives a labeled molecule combined with the information molecule. This component corresponds to the receptor of a living cell and is selectively bound to a specific labeled molecule. The molecule information decoder 72 decodes the information coded in the information molecule. When information encoding is performed on protein through chemical reaction, such as phosphorylation or ubiquitination, the information is decoded by monitoring the effect caused by the chemical-reacted protein at the molecular receiver 70.

In the above-described example, the labeled molecule receiving unit 71 of the molecular receiver 70 is an insulin receptor, and the labeled molecule (insulin) combined with the information molecule and transmitted through the molecule transmission channel 50 is captured by the labeled molecule receiving unit 71, and therefore, the information molecule A is received at the molecular receiver 70. When the insulin is captured by the labeled molecule receiving unit 71, the molecular receiver 70 takes the combination of the insulin and the information molecule A inside it by means of receptor-mediated endocytosis. For more information about receptor-mediated endocytosis, see YONEDA, Yoshihiro, "Getting into Intracellular Transport", ISBN: 4897069963, Yodosha Co., Ltd. at pp. 45-53. The information molecule taken inside the molecular receiver 70 is decoded at the molecule information decoder 72.

In the above-described example, insulin is used as the labeled molecule 56 because the information molecule 55 is addressed to the molecular receiver 70 located near the liver. If the information molecule 55 is addressed to a molecular receiver 70 implanted near the kidney, then aldosterone, which is a hormone acting on the kidney, can be used as the labeled molecule 56. By selecting appropriate labeled molecules depending on the destination, information coded molecules can be transmitted to the desired addresses using the in vivo molecule signaling path. This arrangement is not limited to the application to the in vivo molecule signaling system, but is also applied to the artificially designed flow path described in the first embodiment. In the latter case, molecular receivers having different types of receptors are placed depending on the destinations to allow information molecules to be transported to the desired address.

Although in the above-described example the information acquired by the sensor is transmitted to the target address, the molecular communication system 2 of the second embodiment can be applied to delivery of medical molecules to a desired address. In this case, the medical molecules are information molecules 55, information encoding is activating the medical molecules so as to be reactive at the molecular receiver 70, and decoding is effectiveness of the drug at the molecular receiver 70.

In the above-described example, both the labeled molecules 56 and the information molecules 55 are generated in the same molecular transmitter 60. This arrangement can be modified to the structure shown in FIG. 11, in which the molecular transmitter 60 is comprised of a first molecular transmitter 60a for generating and emitting labeled molecules 56, and a second molecular transmitter 60b for generating and emitting information molecules 55. In this case, the first molecular transmitter 60a may be a living cell existing in a living body, and the second molecular transmitter 60b may be implanted near the fist molecular transmitter 60a.

Figure 11:
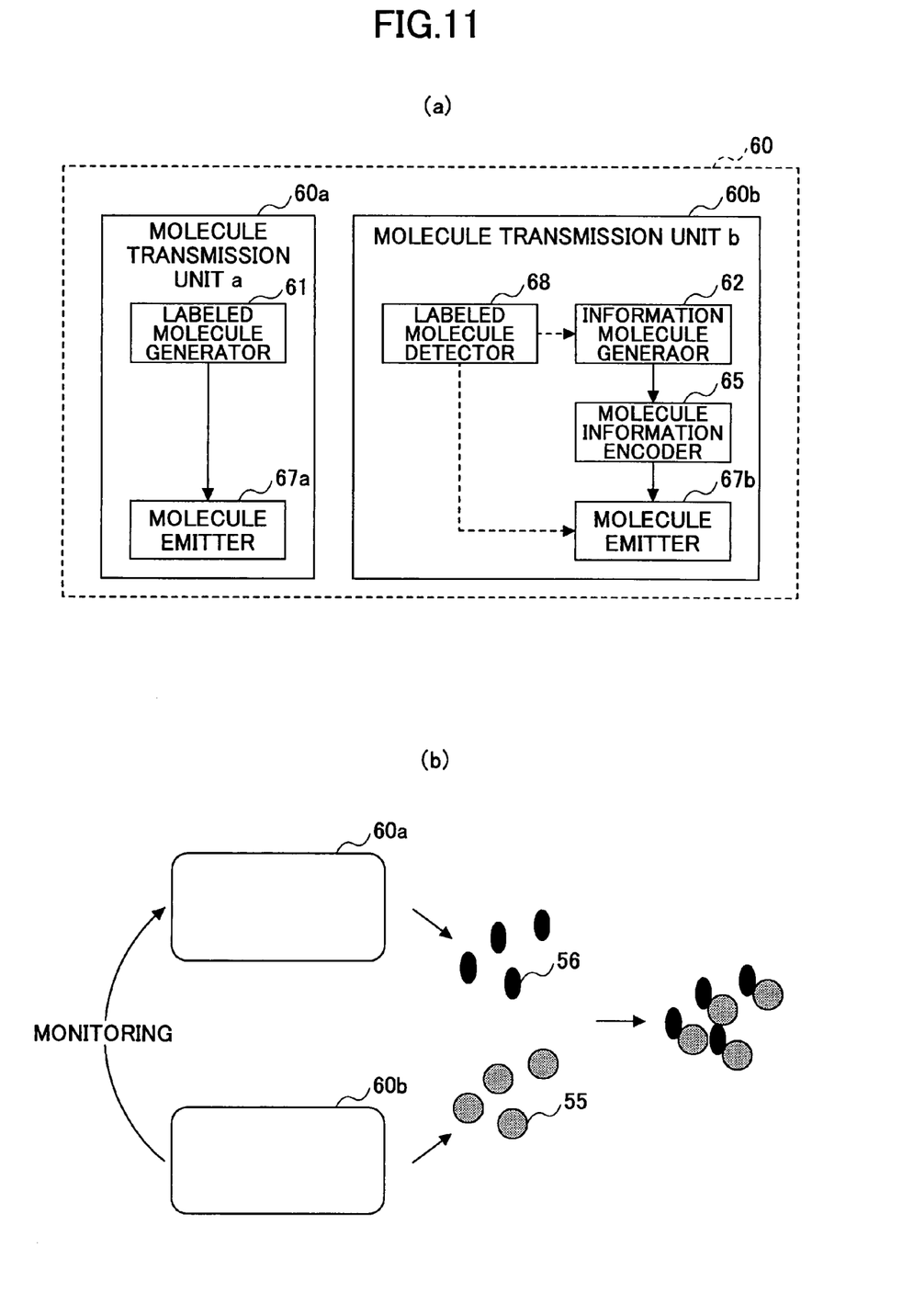
FIG. 11 illustrates a third example of the molecular transmitter used in the molecular communication system shown in FIG. 7.

As illustrated in FIG. 11(a), the second molecular transmitter 60b has a labeled molecule detector 68, in addition to the information molecule generator 62, the molecule information encoder 65 and the molecule emitter 67b. The labeled molecule detector 68 is, for example, a receptor for the labeled molecule 56, and it detects emission of the labeled molecule 56 by receiving a portion of the labeled molecule 56 output from the first molecular transmitter (living cell) 60a. Upon detecting the emission (secretion) of the labeled molecule 56, the labeled molecule detector 68 instructs the information molecule generator 62 to produce molecules to be encoded. The molecule information encoder 65 encodes information in the produced molecules, and the molecule emitter 67b outputs the information molecules 55.

Alternatively, instead of generating information molecules after the detection of emission of labeled molecules 56, information molecules 55 may be generated and stored in advance in the molecular transmitter 60b. In this case, the labeled molecule detector 68 instructs the molecule emitter 67b to immediately emit the information molecules 55 upon detection of emission of the labeled molecules 56, as indicated by the L-shaped dashed arrow in FIG. 11(a). To achieve this, when a living cell or a mutant cell derived from the living cell is used as the molecular transmitter 60, the labeled molecule detector 68 transmits calcium ions to the molecule emitter 67b as signaling, upon detection of hormonal secretion. Calcium ions are generally used in living cells to emit molecules. Detection of the hormonal secretion at the labeled molecule detector 68 can be achieved by making use of a receptor for the secreted hormone. Capturing of a secreted hormone at the receptor triggers transmission of calcium ions to the molecule emitter 67b. This mechanism can be realized by making use of a chimeric receptor which allows wide range of combinations between labeled molecules and actions caused by reception of the labeled molecules at the receptor. For more information about the chimeric receptor, see M. Kawahara, et al., "Selection of genetically modified cell population using hapten-specific antibody/receptor chimera," Biochemical and Biophysical Research Communications, "vol. 315, pp. 132-138, February 2004. When calcium ions act on the molecule emitter 67b, exocytosis which is a molecule releasing mechanism is promoted in the molecule emitter 67b.

With any one of the above-described structures, the second molecular transmitter 60b emits information molecules 55 synchronized with the emission timing of the labeled mol ecule 56 from the first molecular transmitter (living cell) 60a, and transmits the combinations of the labeled molecules 56 and the information molecules 55 along the molecule transmission channel 50, as illustrated in FIG. 11(b).

Figure 12:
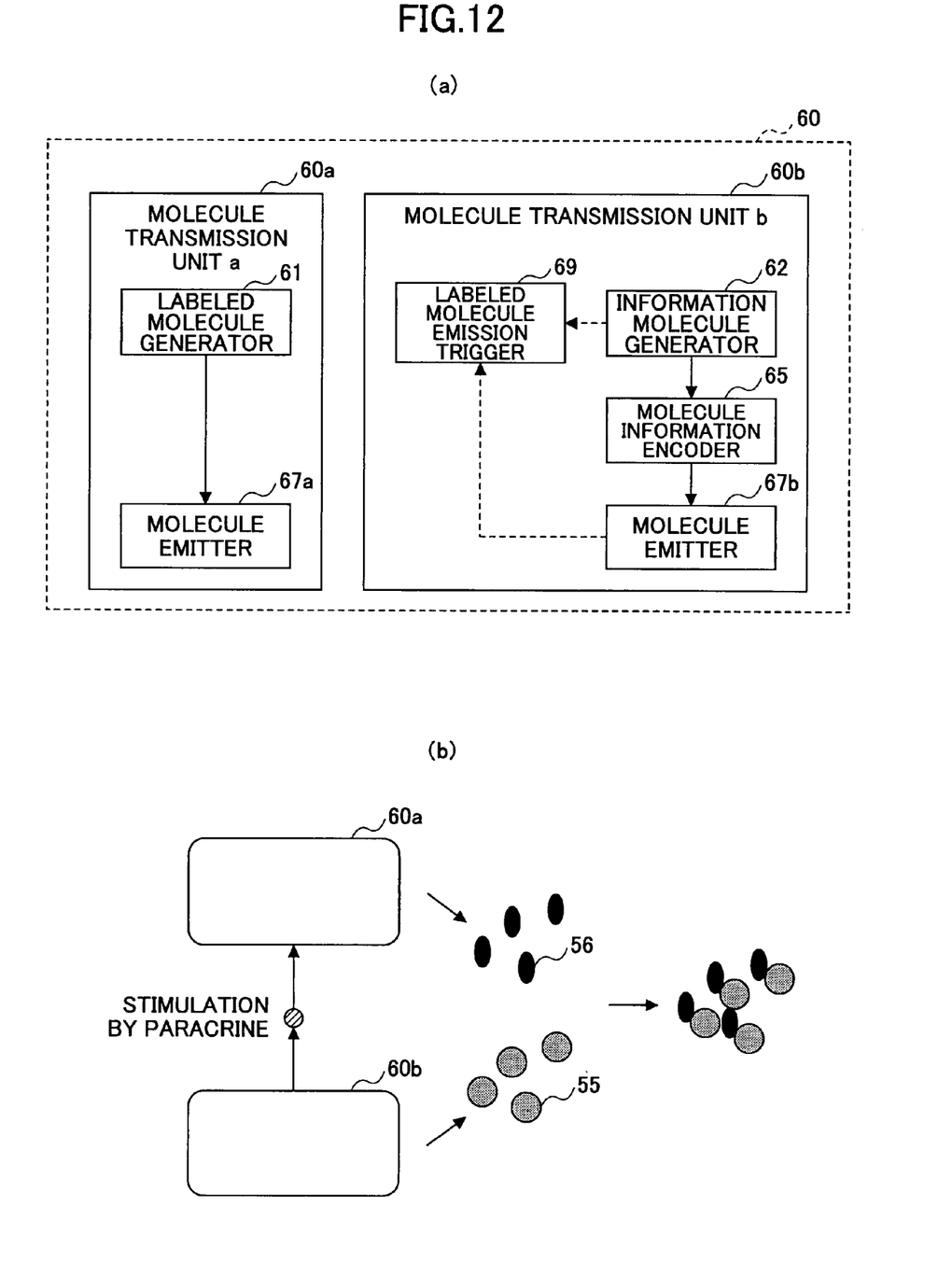
FIG. 12 illustrates a fourth example of the molecular transmitter used in the molecular communication system shown in FIG. 7.

FIG. 12 illustrates still another example 3. In this example, when emitting information molecules 55, the second molecular transmitter 60b instructs the first molecular transmitter (living cell) 60a to emit labeled molecules 56, as illustrated in FIG. 12(b).

The second molecular transmitter 60b has a labeled molecule emission triggering unit 69, in addition to the information molecule generator 62, the molecule information encoder 65 and the molecule emitter 67b. If the labeled molecules 56 emitted from the first molecular transmitter (living cell) 60a are hormones, the labeled molecule emission triggering unit 69 outputs hormonal secretion stimulating hormones to the first molecular transmitter 60a.

When the molecular transmitter 60 is structured as a set of molecular transmitters, as illustrated in FIG. 11 and FIG. 12, the binding probability between labeled molecules 56 and information molecules 55 may be lowered, as compared with generating both labeled molecule 56 and information molecule 55 in a single molecular transmitter. However, this does not lead to a serious problem because a certain level of binding probability is ensured. The problem due to the decrease in the binding probability can also be avoided by lowering the decoding threshold (to 60%, for example) in the molecular receiver 70. In the examples shown in FIG. 11 and FIG. 12, an artificially altered living cell or a mechanically structured device may be used as the molecular transmitter 60a, in place of a living cell, as long as the functions of the molecular transmitter 60a are performed.

According to the first and second embodiments of the invention, a molecular communication system with good controllability of information transmission can be achieved with a wider range of applications for in vivo data transmission to which a conventional communication system cannot be applied or for communication between molecule-scale transmitter and receiver.

Because the molecular communication system is driven and operated by chemical energies for encoding and transmitting information in nanoscale molecules, the energy consumption is greatly reduced as compared with the conventional communication systems, while the information density is greatly increased.

In addition, biochemical phenomena or statuses occurring on the transmission side can be transmitted to and reproduced at the receiving side using molecules, unlike in the conventional communication systems, and a novel form of communication based on biochemical reaction can be provided.

This international application claims the benefit of the priority date of Japanese Patent Application No. 2005-063105 filed on Mar. 7, 2005, and the entire content of which application is incorporated herein by reference.

The invention claimed is:

1. A molecular communication system, comprising:
    a molecular transmitter for transmitting an information molecule in which prescribed information is coded;
    a molecular receiver for receiving the information molecule; and
    a molecule transmission channel extending between the molecular transmitter and the molecular receiver,
    wherein the molecular transmission channel includes a transmission path formed of macromolecular materials and a carrier molecule moving in a prescribed direction along the transmission path, and the information molecule is carried on the carrier molecule and transported to the molecular receiver, and
    wherein the molecular receiver includes a molecule receiving unit configured to receive the information molecule carried on the carrier molecule and separate the information molecule from the carrier molecule, and a decoder configured to decode the separated information molecule,
    wherein the information molecule transmitted from the molecular transmitter has biochemical information encoded using a type, a concentration, a composition, or any combination thereof, of the molecule, and the biochemical information is decoded at the molecular receiver according to generation of protein or intensity of behavior caused at the molecular receiver by the information molecule.

2. The molecular communication system of claim 1, wherein the transmission path is formed of rail molecules, the carrier molecule is a motor molecule, and the information molecule is carried on the motor molecule and transported to the molecular receiver.

3. The molecular communication system of claim 1, wherein the transmission path is formed of motor molecules, the carrier molecule is a rail molecule, and the information molecule is carried on the rail molecule and transported to the molecular receiver.

4. The molecular communication system of claim 1, wherein the transmission path is placed in a solution containing adenosine triphosphate (ATP), and a moving speed of the carrier molecule is controllable by changing at least one of ATP concentration, magnesium ion concentration, temperature of the solution, and viscosity resistance.

5. The molecular communication system of claim 1, wherein the information molecule is encapsulated by a substance capable of encapsulating the information molecule and is protected from an environmental factor denaturing the information molecule being transmitted through the molecule transmission channel, and a property of the information molecule is hidden with respect to the carrier molecule.

6. The molecular communication system of claim 1,
wherein the information molecule has a binder section comprised of a single-stranded DNA base sequence, and
wherein the carrier molecule has a single-stranded DNA base sequence complementary with respect to the single-stranded DNA base sequence of the information molecule, and carries the information molecule by forming a double-stranded DNA base sequence between the single-stranded DNA base sequences of the information molecule and the carrier molecule.

7. The molecular communication system of claim 1, wherein the biochemical information is decoded at the molecular receiver according to generation of protein.

8. A molecular communication method, comprising the steps of:
providing a transmission path formed of macromolecular materials between a molecular transmitter and a molecular receiver;
allowing a carrier molecule to move in a prescribed direction along the transmission path;
generating an information molecule by encoding prescribed information in a molecule;
outputting the information molecule from the molecular transmitter to load the information molecule on the carrier molecule moving along the transmission channel;
transporting the information molecule to the molecular receiver;
receiving the information molecule carried on the carrier molecule at the molecular receiver;
separating the information molecule from the carrier molecule; and
decoding the separated information molecule,
wherein biochemical information is encoded making use of a type, a concentration, a composition, or any combination thereof, of the molecule, and
wherein the biochemical information is decoded according to generation of protein or intensity of behavior caused at the molecular receiver by the information molecule.

9. The molecular communication method of claim 8, wherein the transmission path is formed of rail molecules, a motor molecule is used as the carrier molecule, and the information molecule is loaded on the motor molecule and transported to the molecular receiver.

10. The molecular communication method of claim 8, wherein the transmission path is formed of motor molecules, a rail molecule is used as the carrier molecule, and the information molecule is loaded on the rail molecule and transported to the molecular receiver.

11. The molecular communication method of claim 8, further comprising the steps of:
arranging the transmission path in a solution containing adenosine triphosphate (ATP); and
adjusting the moving speed of the carrier molecule by changing at least one of ATP concentration, magnesium ion concentration, temperature of the solution, and viscosity resistance.

12. The molecular communication method of claim 8, further comprising the steps of:
encapsulating the information molecule using a substance capable of encapsulating the information molecule to protect the information molecule from an environmental factor denaturing the information molecule being transmitted through the molecule transmission channel, and to hide a property of the information molecule with respect to the carrier molecule.

13. The molecular communication method of claim 8,
wherein the information molecule generating step includes providing a binder section comprised of a single-stranded DNA base sequence to the information molecule, and
wherein the information molecule is loaded on the carrier molecule by forming a double strand between the single-stranded DNA base sequence of the information molecule and a complementary single-stranded DNA base sequence of the carrier molecule.

14. A molecular communication system, comprising:
a molecular transmitter for transmitting an information molecule in which prescribed information is coded:
a molecular receiver for receiving the information molecule; and
a molecule transmission channel extending between the molecular transmitter and the molecular receiver
wherein the molecular transmitter includes:
a first molecular transmitter having the labeled molecule generator and a first molecule emitter for emitting the labeled molecule; and
a second molecular transmitter having the molecule information encoder and a second molecule emitter for emitting the information molecule,
wherein the second molecular transmitter further has a labeled molecule detector for detecting the labeled molecule emitted from the first molecular transmitter, and upon detection of the labeled molecule, the second molecule emitter encodes the information molecule to be emitted and emits the encoded information molecule to the molecule transmission channel.

15. A molecular communication system, comprising:
a molecular transmitter for transmitting an information molecule in which prescribed information is coded;
a molecular receiver for receiving the information molecule; and
a molecule transmission channel extending between the molecular transmitter and the molecular receiver,
wherein the molecular transmitter includes:
a first molecular transmitter having the labeled molecule generator and a first molecule emitter for emitting the labeled molecule; and
a second molecular transmitter having the molecule information encoder and a second molecule emitter for emitting the information molecule,
wherein the second molecular transmitter further has a labeled molecule emission trigger for outputting stimulating substances to instruct the first molecular transmitter to emit the labeled molecule when emitting the information molecule.

16. The molecular communication system of claim 14 or 15, wherein the molecule transmission channel is a flow path, and the molecule emitter emits the labeled molecule and the information molecule such that the labeled molecule and the information molecule are bound to each other inside or outside the molecule transmitter so as to allow the information molecule to be transported to the molecular receiver by means of the labeled molecule.

17. A molecular communication method comprising the steps of:
- at a molecular transmitter, generating an information molecule in which prescribed information is encoded and a labeled molecule capable of identifying a molecular receiver to which the information molecule is addressed;
- emitting the information molecule and the labeled molecule from the molecular transmitter to a molecule transmission channel such that the information molecule and the labeled molecule are combined with each other inside or outside the molecular transmitter;
- transporting the combination of the information molecule and the labeled molecule to the molecular receiver along the molecule transmission channel; and
- receiving the combination of the information molecule and the labeled molecule at the molecular receiver;
- taking the information molecule into the molecular receiver; and
- decoding the information molecule
- wherein at a first part of the molecular transmitter the labeled molecule is generated and emitted;
- at a second part of the molecular transmitter the information molecule is encoded and emitted,
- wherein the second part of the molecular transmitter outputs stimulating substances to instruct the first part of the molecular transmitter to emit the labeled molecule when emitting the information molecule based upon a labeled molecule emission trigger.

18. A molecular communication method, comprising the steps of:
- at a molecular transmitter, generating an information molecule in which prescribed information is encoded and a labeled molecule capable of identifying a molecular receiver to which the information molecule is addressed;
- emitting the information molecule and the labeled molecule from the molecular transmitter to a molecule transmission channel such that the information molecule and the labeled molecule are combined with each other inside or outside the molecular transmitter;
- transporting the combination of the information molecule and the labeled molecule to the molecular receiver along the molecule transmission channel;
- receiving the combination of the information molecule and the labeled molecule at the molecular receiver;
- taking the information molecule into the molecular receiver: and
- decoding the information molecule,
- wherein at the molecular transmitter, monitoring emission of the labeled molecule; and
- upon detection of emission of the labeled molecule, encoding the information molecule to be emitted and emitting the information molecule.

* * * * *

SEQUENCE LISTING

```
<160> NUMBER OF SEQ ID NOS: 1

<210> SEQ ID NO 1
<211> LENGTH: 13
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 1
tgcacgacca gtt                                                      13
```